Patented Mar. 28, 1944

2,345,549

UNITED STATES PATENT OFFICE 2,345,549

PROCESS FOR MAKING LASTING RECORDS

Peter S. Christaldi, Upper Montclair, Albert Steadman, Nutley, and David T. Wilber, Clifton, N. J., assignors to Allen B. Du Mont Laboratories, Inc., Passaic, N. J., a corporation of Delaware No Drawing. Application October 16, 1943, Serial No. 506,598

4 Claims. (Cl. 95—5)

This invention relates to a method of making records in which materials that are sensitive to light are used.

In accordance with this invention, writing or figures or designs of different sorts can be quickly recorded so that they will be lasting without employing the steps of photographing, developing, fixing, and washing, as in the ordinary way. Records are made by this invention practically instantaneously and are lasting.

The invention is particularly useful, for example, for recording patterns that are caused to appear by means of an electron beam upon the face of an oscillograph tube, although it can be used for other purposes.

In carrying out the invention, an emulsion of a salt is prepared, which has the property of changing color when exposed to light as a result of chemical decomposition. The reaction which causes the change is accelerated when a higher concentration of ultraviolet light is used. The reaction is also accelerated by the presence of small amounts of moisture. The emulsion is deposited upon a base or support so that it can be exposed to the pattern or figure of which a record is to be made.

The following is given as a specific example illustrating the invention, from which it will be seen that other salts of which the color is quickly changed by ultraviolet light may be used.

An equeous emulsion of zince cadmium sulphide and manganese is made, using from about one part per thousand to one part per ten thousand of manganese, compared to the zinc cadmium sulphide by weight. Approximately 85% zinc and 15% cadmium are present in the zinc cadmium sulphide. The emulsion used in coating the substrate or base may consist of gelatine, polyvinyl alcohol, methyl cellulose, or any water soluble medium which produces sufficient viscosity to permit the formation of an emulsion which will remain constant throughout the mass during application. Said application can be by any conventional method such as applying a layer of uniform thickness by roll-coat, by spreading by a blade, or by spraying on a substrate or solid base such as wood, metal, glass or film, and is permitted to set. It has a bright yellow color.

Since the presence of moisture is desirable during the process of producing a permanent record, the coated substrate should be exposed to moisture before it is brought into proximity to the source of ultra-violet light, which may, for example, be a pattern on an oscillograph tube made by an electron beam sweeping across a prepared surface, whereupon the parts exposed to the light from the pattern change quickly in color from bright yellow to gray and remain so for a long time.

What is claimed is:

1. The process of making a lasting record, which comprises exposing an emulsion of zinc cadmium sulphide and manganese in the presence of moisture to ultraviolet light.

2. The process of claim 1, in which the emulsion is supported on a solid surface.

3. The process of claim 1, in which the manganese is 1 part in about 1000 to 10,000 parts of the zinc cadmium sulphide.

4. The process of claim 1, in which the exposure is sufficient to change the color of the exposed part from yellow to gray.

PETER S. CHRISTALDI.
ALBERT STEADMAN.
DAVID T. WILBER.